United States Patent
Chowdhury et al.

(10) Patent No.: US 12,545,616 B2
(45) Date of Patent: Feb. 10, 2026

(54) GLASS SUBSTRATE HEAT CHAMFERING METHOD AND APPARATUS

(71) Applicant: Corning Incorporated, Corning, NY (US)

(72) Inventors: Dipakbin Qasem Chowdhury, Corning, NY (US); Euiho Kim, Asan-si (KR); Euisoo Kim, Seongnam-si (KR); Seong-ryong Ryoo, Asan-si (KR)

(73) Assignee: CORNING INCORPORATED, Corning, NY (US)

( * ) Notice: Subject to any disclaimer, the term of this patent is extended or adjusted under 35 U.S.C. 154(b) by 301 days.

(21) Appl. No.: 18/039,532

(22) PCT Filed: Dec. 17, 2021

(86) PCT No.: PCT/US2021/063942
§ 371 (c)(1),
(2) Date: May 31, 2023

(87) PCT Pub. No.: WO2022/133162
PCT Pub. Date: Jun. 23, 2022

(65) Prior Publication Data
US 2024/0076226 A1    Mar. 7, 2024

(30) Foreign Application Priority Data

Dec. 17, 2020  (KR) .................. 10-2020-0177703

(51) Int. Cl.
*C03B 33/09* (2006.01)
*B23K 26/38* (2014.01)
*C03B 33/07* (2006.01)

(52) U.S. Cl.
CPC ............ *C03B 33/091* (2013.01); *B23K 26/38* (2013.01); *C03B 33/074* (2013.01)

(58) Field of Classification Search
CPC ........ C03B 33/09–093; B23Q 11/0042; B21B 15/0007; B21B 2015/0021
See application file for complete search history.

(56) References Cited

U.S. PATENT DOCUMENTS 3,909,226 A * 9/1975 McCourty ............... C03B 33/09
                                                        225/2
5,110,340 A * 5/1992 Ikola ..................... C03B 33/033
                                                        225/93.5
(Continued)

FOREIGN PATENT DOCUMENTS

CN      104619657 A      5/2015
JP      2003-136134 A    5/2003
(Continued)

OTHER PUBLICATIONS

International Search Report and Written Opinion of the International Searching Authority; PCT/US2021/063942; mailed on Apr. 19, 2022, 19 pages; International Searching Authority.

(Continued)

*Primary Examiner* — Erin Snelting

(57) ABSTRACT

Provided is a glass substrate heat chamfering method. An edge of a glass substrate (100) is chamfered by applying thermal shock to the edge of the glass substrate (100), thereby peeling a strip (100a) off from the edge of the glass substrate (100). The strip is cut at a predetermined point thereon before being broken due to the weight thereof. The strip (100a) is cut by applying at least one of heat and a laser beam to the predetermined point or by applying a flame (300a) of a torch (300) to the predetermined point. The application of the thermal shock includes brining a heating element (210) into contact with the edge of the glass substrate (100). In the chamfering, the heating element (210)

(Continued)

is relatively moved along the edge of the glass substrate (100) while being brought into contact with the edge of the glass substrate (100).

16 Claims, 6 Drawing Sheets

(56) References Cited

U.S. PATENT DOCUMENTS

| | | |
|---|---|---|
| 2010/0320179 A1 | 12/2010 | Morita et al. |
| 2011/0107894 A1 | 5/2011 | Maekawa et al. |
| 2012/0055905 A1 | 3/2012 | Schmidt et al. |
| 2013/0126573 A1 | 5/2013 | Hosseini et al. |
| 2015/0259237 A1 | 9/2015 | Kwon et al. |
| 2018/0043458 A1 | 2/2018 | Barnes et al. |
| 2020/0230774 A1 | 7/2020 | Lee et al. |
| 2020/0369560 A1 | 11/2020 | Takeda et al. |

FOREIGN PATENT DOCUMENTS

| | | |
|---|---|---|
| JP | 2014-177369 A | 9/2014 |
| JP | 2014-210307 A | 11/2014 |
| KR | 97-0004426 U | 2/1997 |
| KR | 10-2003-0049456 A | 6/2003 |
| KR | 10-2012-0018765 A | 3/2012 |
| KR | 10-2014-0017855 A | 2/2014 |
| KR | 10-1405442 B1 | 6/2014 |
| KR | 10-2015-0133068 A | 11/2015 |
| KR | 10-1574934 B1 | 12/2015 |
| KR | 10-1859831 B1 | 6/2018 |
| WO | 2015/178646 A1 | 11/2015 |
| WO | 2015/182856 A1 | 12/2015 |

OTHER PUBLICATIONS

Invitation to Pay Additional Fees received for PCT Patent Application No. PCT/US2021/063942, mailed on Feb. 10, 2022, 2 pages.
Chinese Patent Application No. 202180092770.1, Office Action dated May 30, 2025, 4 pages (English Translation only), Chinese Patent Office.
Korean Patent Application No. 10-2020-0177703, Office Action dated Aug. 25, 2025, 5 pages (English Translation only), Korean Patent Office.

* cited by examiner

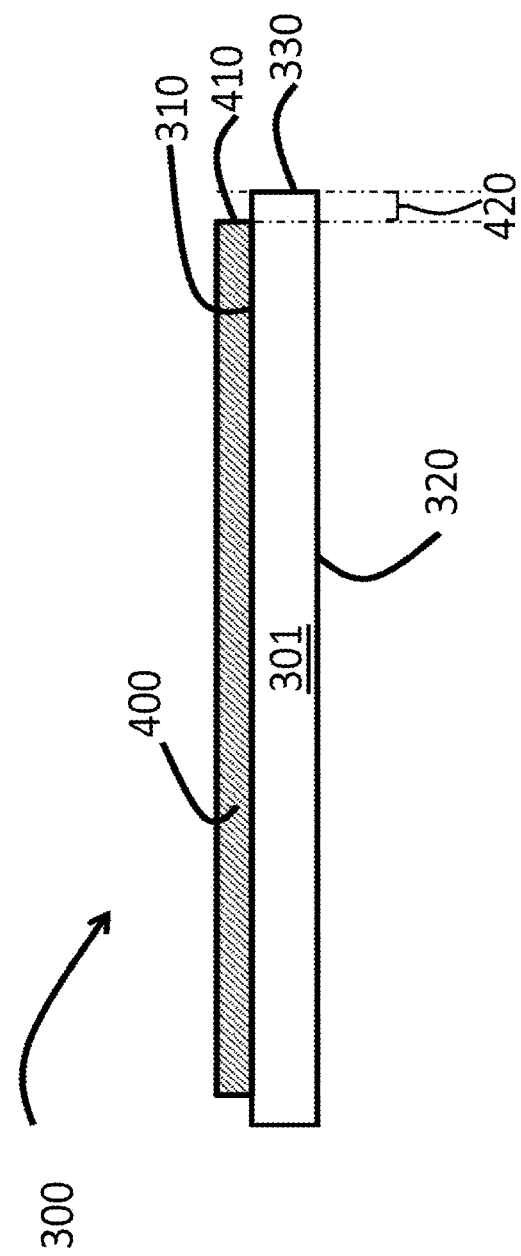

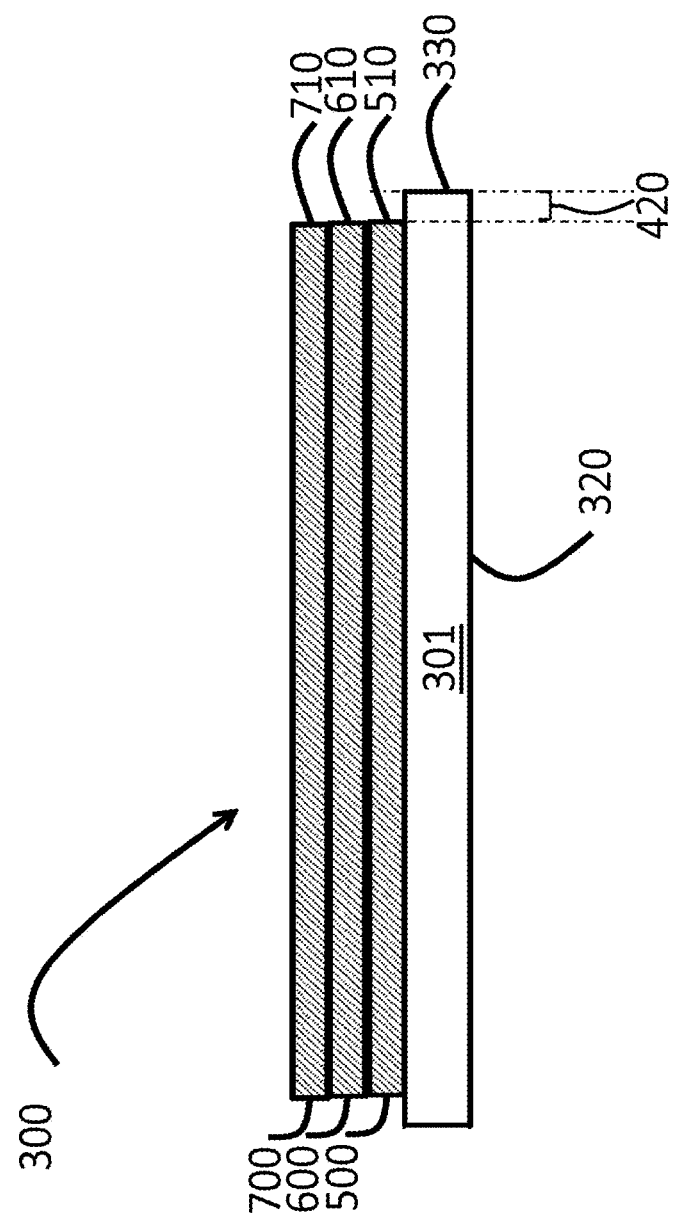

GLASS SUBSTRATE HEAT CHAMFERING METHOD AND APPARATUS

CROSS-REFERENCE TO RELATED APPLICATIONS

This application claims the benefit of priority under 35 U.S.C. § 371 of International Application No. PCT/US2021/063942, filed on Dec. 17, 2021, which claims the benefit of priority under 35 U.S.C. § 119 of Korean Patent Application Serial No. 10-2020-0177703 filed on Dec. 17, 2020, the content of which are relied upon and incorporated herein by reference in their entirety.

BACKGROUND

Field

The present disclosure relates to a method and an apparatus for managing a strip produced in heat chamfering.

Description of Related Art

Heat chamfering is a process of peeling a thin strip off from a glass substrate by applying thermal shock to edges of the glass substrate so that defects are removed from the edges of the glass substrate, thereby increasing the strength of the glass substrate.

However, there may be a restriction in that the strength of a glass substrate chamfered by a related-art method may not be increased as much as expected, which may be problematic.

SUMMARY

Various aspects of the present disclosure provide a heat chamfering method and apparatus able to further increase the strength of a glass substrate.

According to an aspect, a glass substrate heat chamfering method may include: chamfering an edge of a glass substrate by applying thermal shock to the edge of the glass substrate, thereby peeling a strip off from the edge of the glass substrate; and before the strip is broken due to the weight thereof, cutting the strip at a predetermined point thereon.

In some embodiments, the cutting may cut the strip by applying at least one of heat and a laser beam to the predetermined point.

In some embodiments, the cutting may cut the strip by applying a flame of a torch to the predetermined point.

In some embodiments, the application of the thermal shock may include bringing a heating element into contact with a portion of the glass substrate, such as the edge of the glass substrate.

In some embodiments, the chamfering may include relatively moving the heating element along the edge of the glass substrate while bringing the heating element into contact with the edge of the glass substrate.

According to another aspect, a glass substrate heat chamfering apparatus may include: a chamfering unit configured to chamfer an edge of a glass substrate by applying thermal shock to the edge of the glass substrate, thereby peeling off a strip from the edge of the glass substrate; and a cutting unit configured to cut the strip at a predetermined point thereon before the strip is broken due to the weight thereof.

In some embodiments, the cutting unit may cut the strip by applying at least one of heat and a laser beam to the predetermined point.

In some embodiments, the cutting unit may cut the strip by applying a flame to the predetermined point.

In some embodiments, the chamfering unit may include a heating element configured to apply the thermal shock to the edge of the glass substrate by contact with the edge of the glass substrate.

In some embodiments, the heating element may include a heating rod.

In some embodiments, the heating element may be heated by high frequency induction.

According to embodiments, the glass substrate heat chamfering method and apparatus able to further increase the strength of a glass substrate may be provided.

The methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

DESCRIPTION OF THE DRAWINGS

FIG. 7 is a side view of a glass article according to one or more embodiments; and FIG. 8 is a side view of a glass article according to one or more embodiments.

DETAILED DESCRIPTION

Figure 1:
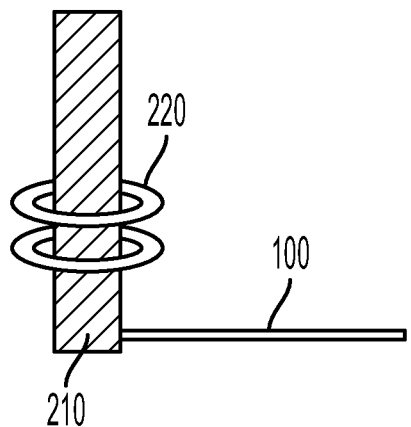
FIG. 1 is a side view illustrating heat chamfering performed on a glass substrate in a glass substrate heat chamfering method according to an embodiment.
Figure 2:
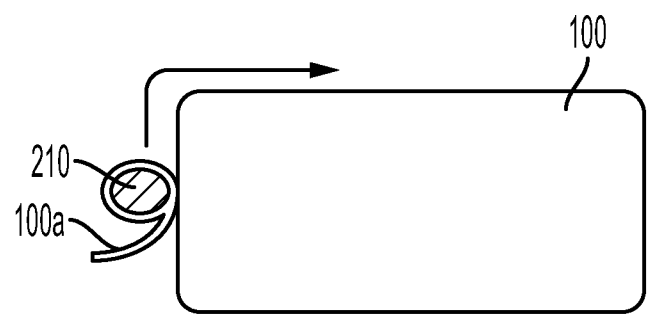
FIG. 2 is a plan view illustrating heat chamfering performed on a glass substrate in a glass substrate heat chamfering method according to an embodiment.

FIG. 1 illustrates heat chamfering performed on a glass substrate in a glass substrate heat chamfering method according to an embodiment, and FIG. 2 is a plan view illustrating heat chamfering performed on a glass substrate by a glass substrate heat chamfering method according to an embodiment.

An edge of a glass substrate 100 may be chamfered by applying thermal shock to the edge of the glass substrate 100. In some embodiments, the thermal shock may be applied by bringing a heating element 210 into contact with the edge of the glass substrate 100. In some embodiments of such embodiments, the edge of the glass substrate 100 may be chamfered by relatively moving the heating element 210 along the edge of the glass substrate 100 while maintaining the heating element 210 in contact with the edge of the glass substrate 100. For the relative movement, only the glass substrate 100 may be moved, only the heating element 210 may be moved, or both the glass substrate 100 and the heating element 210 may be moved.

The main plane of the glass substrate 100 may have an oblong shape. However, the glass substrate 100 is not limited to having a specific shape, and may have a polygonal shape, a circular shape, an elliptical shape, or the like. In the present disclosure, the substrate is not limited to a thin substrate in which both the transversal length (e.g. a distance in the X-axis direction) and the longitudinal length (e.g. a distance in the Y-axis direction) of the main plane is relatively greater than the thickness (e.g. a distance in the Z-axis direction) of the main plane. However, the substrate is not limited thereto, and may have a variety of other shapes. For example, the substrate may be a thick block.

The glass substrate 100 according to the present disclosure may include substrates of any glass materials (e.g. borosilicate glass).

In a case in which the main plane of the glass substrate 100 referred to as an X-Y plane has an oblong shape, the heating element 210 may perform chamfering while relatively moving in the X and Y directions along and in contact with four edges of the glass substrate 100. The speed of the relative movement may vary depending on the composition of glass, temperature conditions, and the shape of the glass substrate 100 to be chamfered. Due to such chamfering, a strip 100a is peeled off from the edges. In some embodiments, the heating element 210 may perform chamfering while being in continuous contact with the four edges of the glass substrate 100. For example, when the four edges of the glass substrate 100 are referred to as the first edge, the second edge, the third edge, and the fourth edge in the clockwise direction, the heating element 210 may chamfer all of the four edges of the glass substrate 100 while relatively moving to the corner between the first edge and the second edge in the X direction along and in contact with the first edge, relatively moving to the corner between the second edge and the third edge in the Y direction along and in contact with the second edge, relatively moving to the corner between the third edge and the fourth edge in the X direction along and in contact with the third edge (i.e. in the direction opposite to the direction of the movement along and in contact with the first edge), and then, relatively moving to the corner between the fourth edge and the first edge in the Y direction along and in contact with the fourth edge (i.e. in the direction opposite to the direction of movement along and in the contact with the second edge).

Due to such chamfering, the thin strip 100a may be peeled off from the glass substrate 100 to remove defects on the edges of the glass substrate 100 and increase the strength of the glass substrate 100.

In some embodiments, while the chamfering is performed, the glass substrate 100 may be located on the top surface of a cooling bed (not shown). The size of the cooling bed may be substantially the same as the size of the glass substrate 100, or may be greater or smaller, depending on the environment in which the chamfering is performed. A refrigerant circulation passage may be provided inside the cooling bed to maintain the temperature of the cooling bed to be constant. In addition, suction ports able to fix the glass substrate 100 by suction may be provided in the surface of the cooling bed. The suction ports may be connected to a vacuum pump providing a partial vacuum. When the surface of the glass substrate 100 is held via vacuum, it may be unnecessary to provide fixing tools on sides of the glass plate in order to fix the glass substrate 100 in place. Thus, contact of the heating element 210 with the four edges of the glass substrate 100 may be easily performed.

In some embodiments, the heating element 210 may include a heating rod. In some embodiments, the distal portion of the heating rod in contact with the glass substrate 100 may have a cylindrical shape. In some embodiments, the heating rod may be a metal rod. For example, a metal rod formed from $MoSi_2$ may be used as the heating rod. However, the heating rod is not limited thereto. At a specific point in time, the heating element 210 may be in point or line contact with the glass substrate 100 (e.g. a case in which a cylindrical portion of a heating element is in contact with the glass substrate 100), or be in surface contact with the glass substrate 100 (e.g. a case in which a heating surface of a heating element having the heating surface is in contact with the glass substrate 100). In some embodiments, the contact line (in the line contact) and the contact surface (in the surface contact) may be parallel to the side surfaces (i.e. the thickness surfaces) of the glass substrate 100. However, the present disclosure is not limited thereto, and the contact line or the contact surface may have a predetermined angle with respect to the side surfaces.

In some embodiments, the heating element 210 may be heated by high frequency induction heating. The heating element 210 may be heated by an induction coil 220 connected to a high frequency induction heater. The heating element 210 may be heated by the induction coil 220 surrounding the peripheral portion of the heating element 210. Thus, the heating element 210 may be located to extend through the center of the induction coil 220. In some embodiments, the induction coil 220 may be implemented using a copper (Cu) coil. In addition, the outer surface of the induction coil 220 may be coated with a ceramic material for electrical safety. In some embodiments, cooling water may flow through the inside of the induction coil 220. The induction coil 220 may heat the heating element 210 to a temperature of about 1200° C. to about 1300° C. by applying power to the heating element 210. The high frequency induction heater to be used is commercially available. Operating conditions of the high frequency induction heater may vary depending on the conditions of the glass substrate 100 and the surrounding environment. For example, the operating conditions may be adjusted in the range from 100 V to 200 V, 60 A to 70 A, and 200 Hz to 300 Hz.

Figure 3:
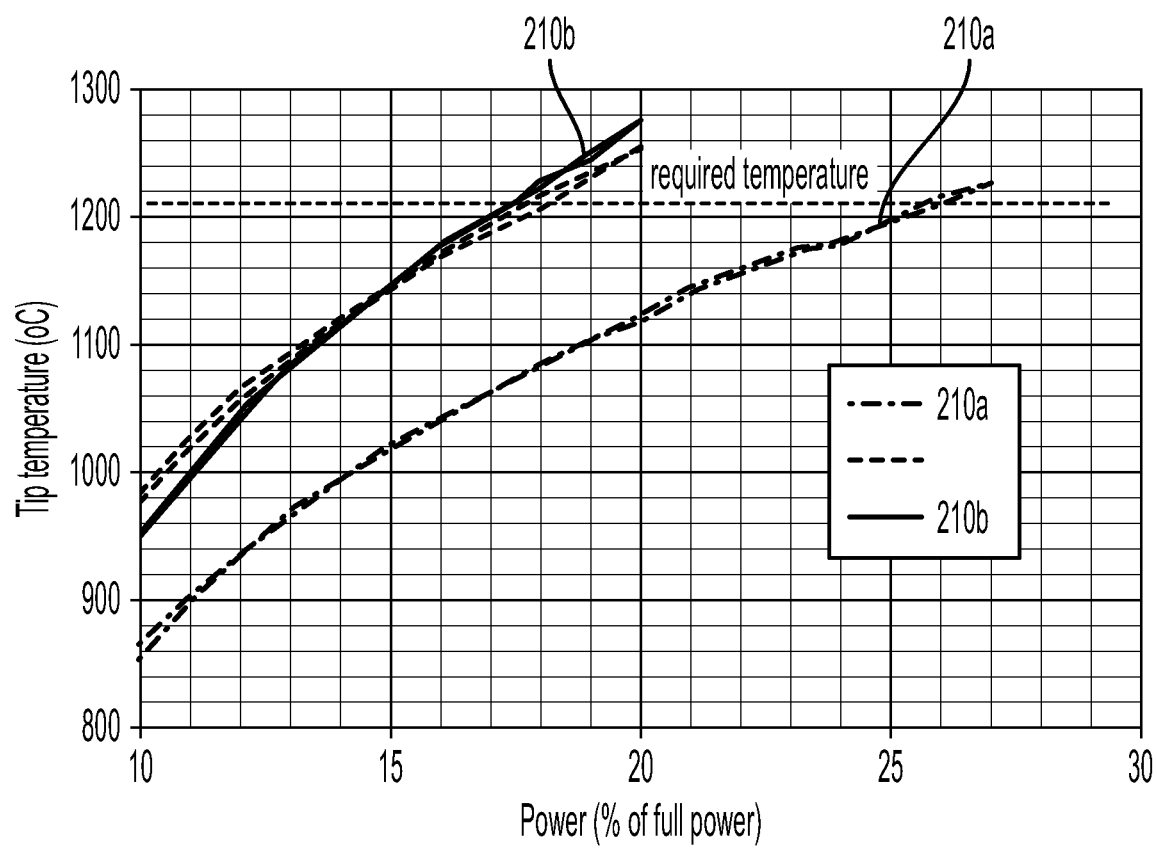
FIG. 3 is a graph illustrating the relationship between the diameter of the heating elements and power.

FIG. 3 is a graph illustrating the relationship between the diameter of the heating elements 210, 210a, and 210b, illustrated in FIG. 2, and power.

An increase in the thicknesses of the heating elements 210, 210a, and 210b may reduce the amount of power consumption necessary for reaching a process temperature (e.g. 1210° C.). In addition, high-temperature deformation in the shape of the heating elements 210, 210a, and 210b (e.g. deformation by which the heating elements 210, 210a, and 210b are bent) may be reduced.

Figure 4:
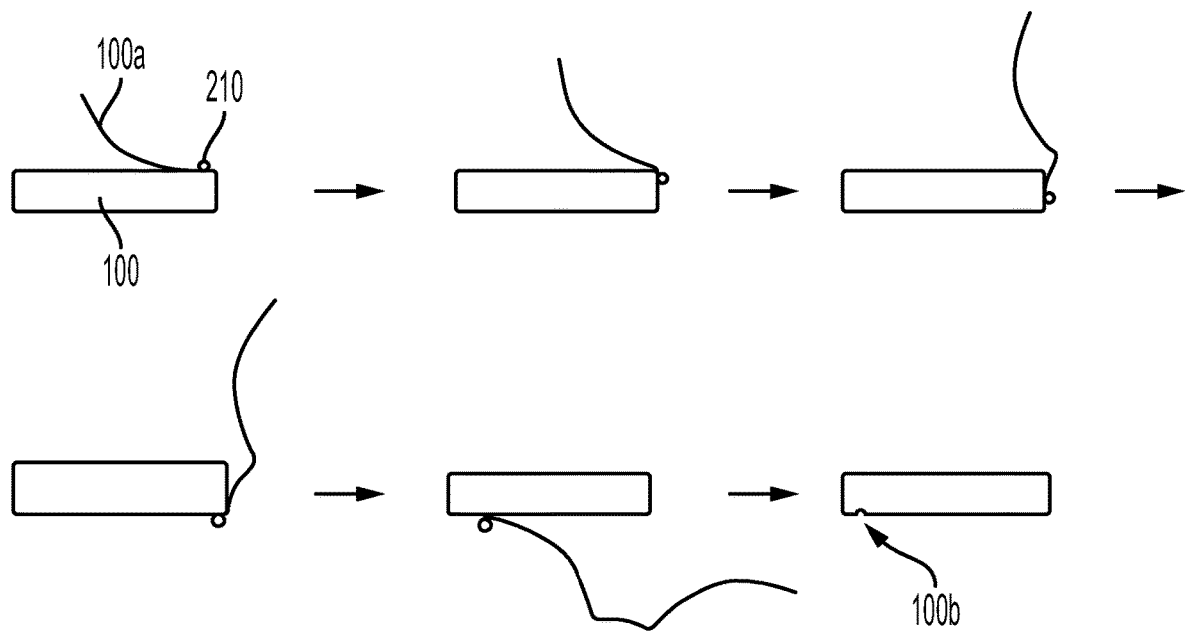
FIG. 4 conceptually illustrates reasons for strength reduction that may be caused by the heat chamfering of a glass substrate.
Figure 5:
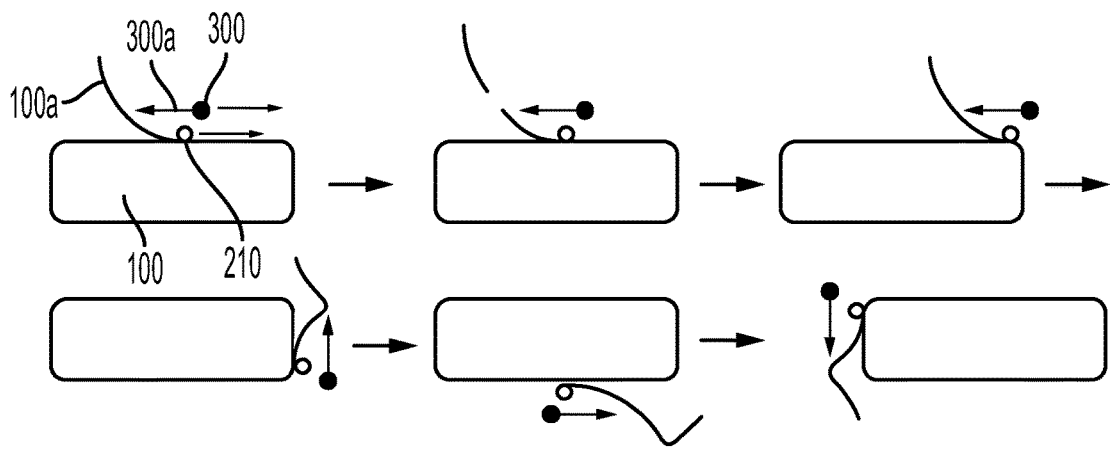
FIG. 5 illustrates a process of cutting a strip in the glass substrate heat chamfering method according to an embodiment.
Figure 6:
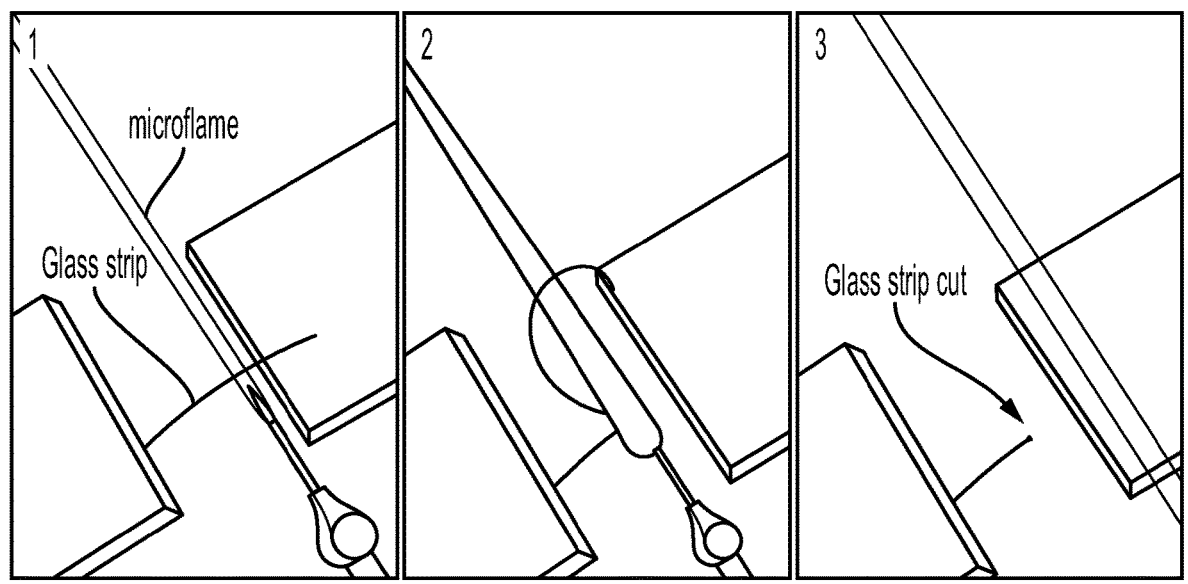
FIG. 6 is an image illustrating a process of cutting a strip by applying a micro-flame thereto.

FIG. 4 conceptually illustrates reasons for strength reduction that may be caused by the heat chamfering of a glass substrate 100, FIG. 5 illustrates a process of cutting a strip in the heat chamfering method for the glass substrate 100 according to an embodiment, and FIG. 6 is an image illustrating a process of cutting a strip by applying a microflame thereto.

While the chamfering is performed, the thin strip 100a is peeled off, which allows the glass substrate 100 to have smooth edges. It is known that this may significantly increase the strength of the glass substrate 100.

However, the present inventors have discovered from research that, despite such chamfering, the glass substrate 100 may have a localized defect 100b in an edge and the defect 100b may result in the reduced strength of the glass substrate 100. In addition, unexpectedly, the present inventors have discovered that such defects may be caused by the chamfering performed to increase the strength. FIG. 4 conceptually illustrates the causes of defects. As illustrated in FIG. 4, a significant problem in the performing of the chamfering process relates to the behavior of the peeled strip 100a. As the chamfering is performed, the length of the strip 100a continues to increase, and the weight of the strip 100a increases by the increased length, so that the strip 100a may be broken. The problem is that, when the strip 100a is broken due to the weight thereof, the defect 100b remains in a local area of the edge of the glass substrate 100, from which the strip 100a is disconnected, and the strength of the local area is reduced to half or less of normal strength, due to the concentration of stress in the local area.

The present disclosure may prevent the above-described problem by cutting the strip 100a at a specific point on the length of the strip 100a before the strip 100a peeled off from the edge of the glass substrate 100 by the chamfering is broken due to the weight thereof. In some embodiments, while the linear section of the glass substrate 100 is chamfered, the length of the strip 100a may be detected, and when the length of the strip 100a reaches a predetermined length (e.g. about 10 cm) or longer, the strip 100a may be cut. In some other embodiments, while the linear section of the glass substrate 100 is chamfered, the position of the heating element or a distance by which the heating element has moved may be detected, and whenever the edge of the glass substrate 100 is chamfered by a predetermined length, the strip 100a may be cut. In some other embodiments, while the linear section of the glass substrate 100 is chamfered, the strip 100a may be cut at a predetermined period of time from a point in time at which the chamfering of the linear section was started. In some embodiments, the strip 100a may be cut immediately before a corner section is chamfered even in the case that the length thereof has not yet reached a predetermined length. For example, when the distance between the heating element 210 and the corner of the edge reaches a predetermined length, the strip 100a may be cut. Alternatively, when a time left before the heating element 210 reaches the corner of the edge reaches a predetermined time, the strip 100a may be cut.

In some embodiments, the strip 100a may be cut by applying heat to the specific point on the strip 100a. When the strip 100a is cut using a mechanical means, vibrations generated during the cutting may be transferred to the edges of the glass substrate 100 through the strip 100a, thereby creating a notch. Accordingly, it may be advantageous that the strip 100a is cut by applying heat to the specific point on the strip 100a in order to reliably cut the strip 100a without causing a mechanical impact to the edges of the glass substrate.

In some embodiments, the strip 100a may be cut by applying a flame 300a of a torch 300 to the specific point on the strip 100a. The torch 300 may use propane as fuel, but the present disclosure is not limited thereto. In some other embodiments, the strip 100a may be cut by irradiating the specific point on the strip 100a with a laser beam.

In some embodiments, a worker may perform at least one of the chamfering and the cutting of the strip 100a while holding and moving at least one of the heating element 210 and the torch 300. However, a more precise and reliable result may be obtained by automatically moving the heating element 210 and the torch 300 using a mechanical means. For example, as illustrated in FIG. 5, the apparatus may be configured such that, when the linear section of an edge of the glass substrate 100 is chamfered, the direction and speed of movement of the heating element 210 may be set to be substantially identical to those of the torch 300, so that the torch 300 may cut the strip 100a while following the movement of the heating element 210. Here, the relative position between the heating element 210 and the torch 300 may be maintained to be constant.

As the result of research, the present inventors have discovered that the speed of the flow of the flame 300a of the torch 300 must be controlled as a key variable in the cutting of the strip 100a. If the speed of the flow of the flame 300a is too slow, the strip 100a may be melted to be deformed and be blown away from the flame 300a. Then, the strip 100a may only be bent instead of being cut. On the other hand, if the speed of the flow of the flame 300a is too fast, the strip 100a may be broken by physical pressure before being cut by heat. This may cause a defect on an edge of the glass substrate 100. Accordingly, the speed of the flow of the flame 300a must be controlled.

In addition, the temperature of the flame 300a is required to be sufficiently high. If the temperature of the flame 300a is low, the strip 100a may not be cut. In some embodiments, the temperature of the flame 300a may range from 1200° C. to 1400° C., but the present disclosure is not limited thereto. In some embodiments, the strip may be cut using a micro-flame of hydrogen, the temperature of which increases up to 2800° C. The temperature of the micro-flame may be 2000° C. or higher. When a core flame is applied to the strip, the strip may be cut immediately.

In some embodiments, the direction of the flame 300a may be parallel to the surface of the edge of the glass substrate 100. This may assist in cutting the strip 100a without applying heat to the glass substrate 100.

In addition, the present disclosure provides a glass substrate heat chamfering apparatus. The glass substrate heat chamfering apparatus may include: a chamfering unit chamfering an edge of a glass substrate by applying thermal shock to the edge of the glass substrate; and a cutting unit cutting the strip at a specific point before the strip peeled off from the edge of the glass substrate by the chamfering is broken due to the weight thereof.

In some embodiments, the chamfering unit may include a heating element applying thermal shock to the edge of the glass substrate by contact with the edge of the glass substrate.

The cutting unit may cut the strip by applying at least one of heat and a laser beam to the specific point on the strip. In some embodiments, the cutting unit may be a torch cutting the strip by applying a flame to the specific point on the strip.

In addition, in some embodiments, the glass substrate heat chamfering apparatus may include a transportation unit transporting at least one of the glass substrate, the heating element, and/or the cutting unit. In addition, in some embodiments, the glass substrate heat chamfering apparatus may include a controller controlling at least one of the movement and the operation of the glass substrate, the heating element, and/or the cutting unit.

As shown in FIG. 7, another aspect of this disclosure pertains to a glass article 300. In one or more embodiments, the glass article includes a glass substrate 301 comprising a first major surface 310, a second major surface 320 opposing the first major surface, and a heat-chamfered edge 330 between the first major surface and the second major surface. In one or more embodiments, the heat-chamfered edge 330 is formed in accordance with one or more embodiments of the glass substrate heat chamfering methods described herein. In one or more embodiments, the glass article 300 includes at least one of a transparent conductive layer, a metal layer and a polymer layer 400 disposed on the first major surface of the glass substrate. In one or more embodiments, the glass article includes a transparent conductive layer 500 disposed on the first major surface 320 (not shown), a metal layer 600 disposed on the transparent conductive layer 500, and a polymer layer 700 disposed on the metal layer. Each of the transparent conductive layer 500, metal layer 600 and the polymer layer 700 forms a layer edge (510, 610 and 710, respectively). In one or more embodiments, the layer edges 510, 610 and 710 are aligned with one another, as shown in FIG. 8. In one or more embodiments, the layer edges 510, 610 and 710 are not aligned with one another (not shown).

In one or more embodiments, the heat-chamfered edge comprises a thickness of less than about 2 mm or less than about 1 mm (e.g., from about 0.01 mm to about 2 mm, from about 0.05 mm to about 2 mm, from about 0.1 mm to about 2 mm, from about 0.15 mm to about 2 mm, from about 0.2 mm to about 2 mm, from about 0.25 mm to about 2 mm, from about 0.3 mm to about 2 mm, from about 0.35 mm to about 2 mm, from about 0.4 mm to about 2 mm, from about 0.45 mm to about 2 mm, from about 0.5 mm to about 2 mm, from about 0.55 mm to about 2 mm, from about 0.6 mm to about 2 mm, from about 0.65 mm to about 2 mm, from about 0.7 mm to about 2 mm, from about 0.8 mm to about 2 mm, from about 0.9 mm to about 2 mm, from about 0.01 mm to about 1.9 mm, from about 0.01 mm to about 1.8 mm, from about 0.01 mm to about 1.7 mm, from about 0.01 mm to about 1.6 mm, from about 0.01 mm to about 1.5 mm, from about 0.01 mm to about 1.4 mm, from about 0.01 mm to about 1.3 mm, from about 0.01 mm to about 1.25 mm, from about 0.01 mm to about 1.2 mm, from about 0.01 mm to about 1.1 mm, or from about 0.01 mm to about 1.05 mm, from about 0.01 mm to about 1 mm, from about 0.05 mm to about 1 mm, from about 0.1 mm to about 1 mm, from about 0.15 mm to about 1 mm, from about 0.2 mm to about 1 mm, from about 0.25 mm to about 1 mm, from about 0.3 mm to about 1 mm, from about 0.35 mm to about 1 mm, from about 0.4 mm to about 1 mm, from about 0.45 mm to about 1 mm, from about 0.5 mm to about 1 mm, from about 0.55 mm to about 1 mm, from about 0.6 mm to about 1 mm, from about 0.65 mm to about 1 mm, from about 0.7 mm to about 1 mm, from about 0.8 mm to about 1 mm, from about 0.9 mm to about 1 mm, from about 0.01 mm to about 0.9 mm, from about 0.01 mm to about 0.8 mm, from about 0.01 mm to about 0.7 mm, from about 0.01 mm to about 0.6 mm, from about 0.01 mm to about 0.5 mm, from about 0.01 mm to about 0.4 mm, from about 0.01 mm to about 0.3 mm, from about 0.01 mm to about 0.25 mm, from about 0.01 mm to about 0.2 mm, from about 0.01 mm to about 0.1 mm, or from about 0.01 mm to about 0.05 mm).

In one or more embodiments, the heat-chamfered edge of the glass substrate comprises an edge strength of 600 MPa or greater. In one or more embodiments, the edge strength of the heat-chamfered edge is in a range from about 600 MPa to about 1400 MPa, from about 650 MPa to about 1400 MPa, from about 700 MPa to about 1400 MPa, from about 750 MPa to about 1400 MPa, from about 800 MPa to about 1400 MPa, from about 850 MPa to about 1400 MPa, from about 900 MPa to about 1400 MPa, from about 1000 MPa to about 1400 MPa, from about 600 MPa to about 1350 MPa, from about 600 MPa to about 1300 MPa, from about 600 MPa to about 1250 MPa, from about 600 MPa to about 1200 MPa, from about 600 MPa to about 1150 MPa, from about 600 MPa to about 1100 MPa, from about 600 MPa to about 1050 MPa, from about 600 MPa to about 1000 MPa, from about 600 MPa to about 950 MPa, from about 600 MPa to about 900 MPa, from about 600 MPa to about 850 MPa, or from about 600 MPa to about 700 MPa). In one or more embodiments, the edge strength is measured by a two-point bend test.

In one or more embodiments, the heat-chamfered edge is at an angle that is different from normal to the first major surface. In one or more embodiments, the heat-chamfered edge is at an angle that is up to and including 30 degrees from normal (e.g., from about 1 to about to about 30, from about 5 to about 30, from about 10 to about 30, from about 15 to about 30, from about 20 to about 30, from about 25 to about 30, from about 1 to about 25, from about 1 to about 20, from about 1 to about 15, from about 1 to about 10, and from about 1 to about 5).

In one or more embodiments, the heat-chamfered edge comprises one or more flaws or a plurality of flaws. In one or more embodiments, the flaws have a maximum length of 11 micrometers or less (e.g., from about 0.1 micrometers to about 11 micrometers, from about 0.1 micrometers to about 10 micrometers, from about 0.1 micrometers to about 9 micrometers, from about 0.1 micrometers to about 8 micrometers, from about 0.1 micrometers to about 7 micrometers, from about 0.1 micrometers to about 6 micrometers, from about 0.1 micrometers to about 5 micrometers, from about 0.1 micrometers to about 4 micrometers, from about 0.1 micrometers to about 3 micrometers, from about 0.1 micrometers to about 2 micrometers, from about 0.1 micrometers to about 1 micrometer, from about 0.5 micrometers to about 11 micrometers, from about 1 micrometers to about 11 micrometers, from about 2 micrometers to about 11 micrometers, from about 3 micrometers to about 11 micrometers, from about 4 micrometers to about 11 micrometers, from about 5 micrometers to about 11 micrometers, from about 6 micrometers to about 11 micrometers, from about 7 micrometers to about 11 micrometers, from about 8 micrometers to about 11 micrometers, or from about 9 micrometers to about 11 micrometers).

In one or more embodiments, as shown in FIGS. 7 and 8, the at least one of a transparent conductive layer, a metal layer and a polymer layer form a layer edge 410, and the distance 420 between the layer edge and the heat-chamfered edge of the glass is less than 200 micrometers. In one or more embodiments, the distance 420 between the layer edge and the heat-chamfered edge of the glass substrate is in a range from about 0 micrometers to about 200 micrometers, from about 10 micrometers to about 200 micrometers, from about 20 micrometers to about 200 micrometers, from about 50 micrometers to about 200 micrometers, from about 100 micrometers to about 200 micrometers, from about 150 micrometers to about 200 micrometers, from about 0 micrometers to about 150 micrometers, from about 0 micrometers to about 100 micrometers, from about 0 micrometers to about 50 micrometers, from about 0 micrometers to about 20 micrometers, from about 0 micrometers to about 10 micrometers, or from about 0 micrometers to about 1 micrometer.

Aspect (1) of this disclosure pertains to a glass substrate heat chamfering method comprising: chamfering an edge of a glass substrate by applying thermal shock to the edge of the glass substrate, thereby peeling a strip off from the edge of the glass substrate; and before the strip is broken due to weight thereof, cutting the strip at a predetermined point thereon.

Aspect (2) of this disclosure pertains to the glass substrate heat chamfering method of Aspect (1), wherein the cutting cuts the strip by applying at least one of heat and a laser beam to the predetermined point.

Aspect (3) of this disclosure pertains to the glass substrate heat chamfering method of Aspect (2), wherein the cutting cuts the strip by applying a flame of a torch to the predetermined point.

Aspect (4) of this disclosure pertains to the glass substrate heat chamfering method of Aspect (3), wherein the application of the thermal shock comprises brining a heating element into contact with the edge of the glass substrate, wherein, when a linear section of the edge of the glass substrate is chamfered, the heating element and the torch move in the same direction and at the same speed.

Aspect (5) of this disclosure pertains to the glass substrate heat chamfering method of Aspect (4), wherein the flame of the torch is directed parallel to a surface of the edge of the glass substrate.

Aspect (6) of this disclosure pertains to the glass substrate heat chamfering method of any one of Aspects (2) through (5), wherein the cutting cuts the strip when the length of the strip is equal to or greater than a predetermined length while chamfering a linear section of the edge of the glass substrate.

Aspect (7) of this disclosure pertains to the glass substrate heat chamfering method of any one of Aspects (2) through (6), wherein the cutting cuts the strip at a predetermined period of time from a point in time at which the chamfering of the linear section is started while the linear section of the edge of the glass substrate is chamfered.

Aspect (8) of this disclosure pertains to the glass substrate heat chamfering method of any one of Aspects (2) through (7), wherein the cutting cuts the strip immediately before a corner section of the edge of the glass substrate is chamfered.

Aspect (9) of this disclosure pertains to the glass substrate heat chamfering method of any one of Aspects (1) through (8), wherein the application of the thermal shock comprises bringing a heating element into contact with the edge of the glass substrate.

Aspect (10) of this disclosure pertains to the glass substrate heat chamfering method of Aspect (9), wherein the chamfering comprises relatively moving the heating element along the edge of the glass substrate while bringing the heating element into contact with the edge of the glass substrate.

Aspect (11) of this disclosure pertains to the glass substrate heat chamfering method of any one of Aspects (9) through (10), wherein the heating element comprises a heating rod.

Aspect (12) of this disclosure pertains to the glass substrate heat chamfering method of any one of Aspects (9) through (11), wherein the heating element is heated by high frequency induction.

Aspect (13) of this disclosure pertains to a glass substrate heat chamfering apparatus comprising: a chamfering unit configured to chamfer an edge of a glass substrate by applying thermal shock to the edge of the glass substrate, thereby peeling off a strip from the edge of the glass substrate; and a cutting unit configured to cut the strip at a predetermined point thereon before the strip is broken due to weight thereof.

Aspect (14) of this disclosure pertains to the glass substrate heat chamfering apparatus of Aspect (13), wherein the cutting unit cuts the strip by applying at least one of heat and a laser beam to the predetermined point.

Aspect (15) of this disclosure pertains to the glass substrate heat chamfering apparatus of Aspect (14), wherein the cutting unit cuts the strip by applying a flame to the predetermined point.

Aspect (16) of this disclosure pertains to the glass substrate heat chamfering apparatus of any one of Aspects (13) through (15), wherein the chamfering unit comprises a heating element configured to apply the thermal shock to the edge of the glass substrate by contact with the edge of the glass substrate.

Aspect (17) of this disclosure pertains to a glass article comprising: a glass substrate comprising a first major surface, a second major surface opposing the first major surface, and a heat-chamfered edge between the first major surface and the second major surface; and at least one of a transparent conductive layer, a metal layer and a polymer layer disposed on the first major surface of the glass substrate, wherein the heat-chamfered edge comprises a thickness of less than 1 mm, and wherein the heat-chamfered edge comprises an edge strength of 600 MPa or greater.

Aspect (18) of this disclosure pertains to the glass article of Aspect (17), wherein the heat chamfered edge forms an angle up to and including 30 degrees from first major surface.

Aspect (19) of this disclosure pertains to the glass article of Aspect (17) or Aspect (18), wherein the heat-chamfered edge comprises one or more flaws and such flaws have a maximum length of 5 micrometers or less.

Aspect (20) of this disclosure pertains to the glass article of any one of Aspects (17) through (19), wherein the at least one of a transparent conductive layer, a metal layer and a polymer layer form a layer edge, and the distance between the layer edge and the heat-chamfered edge of the glass substrate is less than 200 micrometers.

Although the foregoing embodiments of the present disclosure have been described, the present disclosure is not limited thereto and may have a variety of other embodiments. The scope of the present disclosure shall be defined by the appended Claims and equivalents thereof. While the appended Claims are rendered so as to avoid the multiple dependent claim format as much as possible, features described in respective dependent claims may be implemented in combinations with not only features described in claims to which the dependent claims refer to but also features described in claims to which the dependent claims do not refer to, unless the context clearly indicates otherwise. Combinations of such features shall be included in the scope of the present disclosure.

What is claimed is:

1. A glass substrate heat chamfering method comprising:
   chamfering an edge of a glass substrate by applying thermal shock to the edge of the glass substrate, thereby peeling a strip off from the edge of the glass substrate; and
   before the strip is broken due to weight thereof, cutting the strip at a predetermined point thereon.

2. The glass substrate heat chamfering method of claim 1, wherein the cutting cuts the strip by applying at least one of heat and a laser beam to the predetermined point.

3. The glass substrate heat chamfering method of claim 2, wherein the cutting cuts the strip by applying a flame of a torch to the predetermined point.

4. The glass substrate heat chamfering method of claim 3, wherein the application of the thermal shock comprises bringing a heating element into contact with the edge of the glass substrate, wherein, when a linear section of the edge of the glass substrate is chamfered, the heating element and the torch move in the same direction and at the same speed.

5. The glass substrate heat chamfering method of claim 4, wherein the flame of the torch is directed parallel to a surface of the edge of the glass substrate.

6. The glass substrate heat chamfering method of claim 2, wherein the cutting cuts the strip when the length of the strip is equal to or greater than a predetermined length while chamfering a linear section of the edge of the glass substrate.

7. The glass substrate heat chamfering method of claim 2, wherein the cutting cuts the strip at a predetermined period of time from a point in time at which the chamfering of a linear section is started while the linear section of the edge of the glass substrate is chamfered.

8. The glass substrate heat chamfering method of claim 2, wherein the cutting cuts the strip immediately before a corner section of the edge of the glass substrate is chamfered.

9. The glass substrate heat chamfering method of claim 1, wherein the application of the thermal shock comprises bringing a heating element into contact with the edge of the glass substrate.

10. The glass substrate heat chamfering method of claim 9, wherein the chamfering comprises relatively moving the heating element along the edge of the glass substrate while bringing the heating element into contact with the edge of the glass substrate.

11. The glass substrate heat chamfering method of claim 9, wherein the heating element comprises a heating rod.

12. The glass substrate heat chamfering method of claim 9, wherein the heating element is heated by high frequency induction.

13. The glass substrate heat chamfering method of claim 1, wherein the method further comprises placing the glass substrate on a top surface of a cooling bed.

14. The glass substrate heat chamfering method of claim 1, wherein the method further comprises using a first heating element to apply thermal shock to a first edge of the glass substrate, using a second heating element to apply thermal shock to a second edge of the glass substrate, using a third heating element to apply thermal shock to a third edge of the glass substrate, and using a fourth heating element to apply thermal shock to a fourth edge of the glass substrate; and
    moving the first heating element, the second heating element, the third heating element, and the fourth heating element along and in contact with the first edge, the second edge, the third edge, and the fourth edge, respectively.

15. The glass substrate heat chamfering method of claim 1, wherein the cutting cuts the strip by applying a microflame of combusted hydrogen to the predetermined point.

16. The glass substrate heat chamfering method of claim 1, wherein the cutting cuts the strip by applying a flame to the predetermined point, and wherein a direction of the flame is parallel to the edge of the glass substrate.

* * * * *